Figure 1:
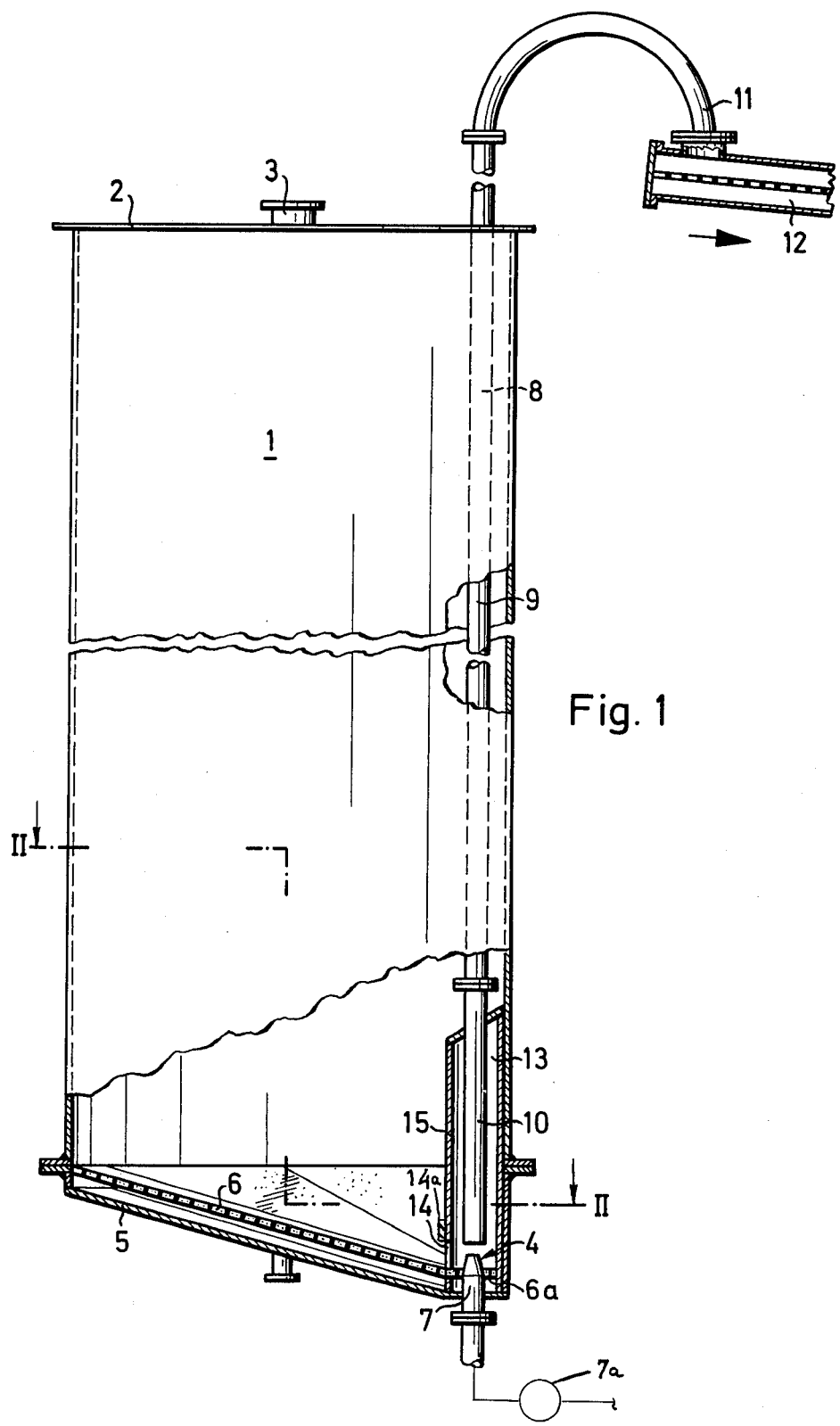

United States Patent [19]
Klein et al.

[11] 3,933,394
[45] Jan. 20, 1976

[54] APPARATUS FOR PNEUMATICALLY WITHDRAWING FINE MATERIAL FROM A SILO CONTAINER

[75] Inventors: Hans Klein, Beckum; Gerhard Balzau, Neubeckum, both of Germany; Jacquy-Pierre Laffargue, Paris, France

[73] Assignee: Polysius AG, Neubeckum, Germany

[22] Filed: Oct. 4, 1974

[21] Appl. No.: 511,735

[30] Foreign Application Priority Data
Oct. 13, 1973 Germany.................... 370179[U]

[52] U.S. Cl. .................. 302/57; 222/193; 302/48; 302/52
[51] Int. Cl.² ........................................ B65G 53/40
[58] Field of Search ............ 302/40, 45, 47, 48, 52, 302/53, 57; 222/193

[56] References Cited
UNITED STATES PATENTS

| | | | |
|---|---|---|---|
| 2,675,274 | 4/1954 | Engelhart............................... | 302/52 |
| 2,941,842 | 6/1960 | Wishaw................................. | 302/52 |
| 3,206,078 | 9/1965 | Leimegger............................ | 222/193 |
| 3,858,763 | 1/1975 | Mack..................................... | 302/52 |

*Primary Examiner*—Evon C. Blunk
*Assistant Examiner*—Jeffrey V. Nase
*Attorney, Agent, or Firm*—Learman & McCulloch

[57] ABSTRACT

Apparatus for withdrawing fine material from a silo having a base sloped toward a discharge zone comprises a chamber within which an air feed nozzle registers with the lower end of a conveyor conduit which extends upwardly out of the silo. Fine material is admitted to the chamber via apertures and is entrained in air passing from the nozzle into the conduit.

11 Claims, 2 Drawing Figures

APPARATUS FOR PNEUMATICALLY WITHDRAWING FINE MATERIAL FROM A SILO CONTAINER

This invention relates to a device for the pneumatic withdrawal of fine material from a silo container having a container base obliquely inclined to a material discharge zone and provided with aeratable elements for loosening the material, the silo also having a pneumatic conveyor conduit whose material-receiving end terminates above a feed air nozzle projecting from below into the material discharge zone.

Silo containers can be utilized for various purposes, for example as a mixing and/or storage silo container for ground raw cement or the like, wherein air is then blown from below through the aeratable elements in the base into the material stored in the container so that the material is pneumatically loosened, mixed, if necessary, and readily extracted. In this connection it should also be stated that the silo containers here concerned are in particular those of relatively high storage capacity.

In known silo containers of large capacity, in addition to the aeratable elements referred to, a number of further outlet fittings such as rotary sliders, flat sliders and other outlet members disposed in the area of the outlet aperture in the base are also provided for emptying the container. Because of their movable parts these outlet fittings are frequently very liable to have faults; in addition they involve a certain structural height, so that firstly the storage capacity of the container is affected thereby and secondly the constructional costs are increased.

Silo containers of this type are also known wherein the exit apertures at the base of the container are provided with a relief roof or a small chamber. This type of relief roof is merely intended to prevent the fine material being extracted from directly pressing on the exit aperture and hence having an undesired effect on the emptying process; a chamber provided above the exit aperture in another known construction acts as a mixing chamber wherein the material coming from the container interior to be extracted is first better mixed. For reasonably satisfactory functioning both of the relief roof and of the mixing chamber, these are preferably connected via a further air line to a filter unit or the like, and this involves extra costs.

In the case of most applications of silo containers it is necessary for the fine material coming from the container to be conveyed upwards, so that it can then for instance be transferred by further conveyor members to further treatment stations or consuming points. With the constructions referred to earlier this is effected for example by disposing a pneumatic conveyor channel below the outlet provided at the base and which directs the fine material to a mechanical or pneumatic vertical conveyor which transports it to the required outlet point. This method involves undesirably high expenditure on equipment, especially for large storage conveyors, with the further disadvantage of relatively high space requirements for the installation and disposition of the conveyor members.

Smaller mixing containers are also known wherein a mixing and conveyor pipe is coaxially disposed, with its lower end terminating above a feed air nozzle projecting through the material discharge zone. This mixing and conveyor pipe ends either in the upper area of the mixing container, for purely mixing containers, or in a second mixing container, or in some other type of material receiving member. Because of the arrangement and construction of the material receiving end there can however be no reliable and controllable extraction of the material with these known constructions.

This invention has for its principal object the avoidance of the defects of known constructions by the provision of a device wherein reliable extraction of the material from the container to a higher disposed material-receiving station can be achieved with relatively low constructional costs and space requirements.

According to the invention, the material-receiving end of the pneumatic conveyor pipe is surrounded at a distance by a relief chamber disposed in the area above the material discharge zone and connected to the remaining interior space in the container by material entry slots in the lowest part of the chamber wall.

With the construction provided by the invention the loosened fine material moving towards the material discharge zone is relatively well directed in controlled fashion towards the aperture in the material receiving end of the pneumatic conveyor pipe. With the aid of the pneumatic conveyor pipe the fine material can then be fed upwards without difficulty either vertically or obliquely, and at the required feed rate to the receiving members concerned. It should be mentioned at this point that "withdrawal" of the fine material means both the emptying of the container and the pneumatic conveyance to required discharge station.

With the device provided by the invention, outlet apertures in the base of silo containers and the outlet fittings associated therewith become unnecessary, so that the difficulties and increased costs associated with these are also avoided. A silo container of relatively large capacity can thus be emptied in extremely simple and economical manner, and at the same time the fine material extracted from the silo container is conveyed to the desired higher disposed receiving station.

In accordance with the invention it is also possible to adjust the discharge rate from the silo container and hence also the feed rate of the pneumatic conveyor pipe. This can be effected in simple manner, either by making the size of the aperture of the material entry slots in the relief chamber adjustable, or by controlling the amount of air supplied through the feed air nozzle. It is obviously also possible to combine these two features.

In accordance with the invention the relief chamber may be of relatively simple construction in that it has a substantially cylindrical housing, or the housing has a polygonal cross-section of generally constant size over its entire height. In either case the height of the relief chamber will be a multiple of its diameter.

If, as in accordance with the invention, the material-receiving end of the pneumatic conveyor pipe is disposed generally coaxially in the relief chamber, there will be extremely effective and uniform flow of material towards the material-receiving end of the conveyor pipe.

Figure 2:
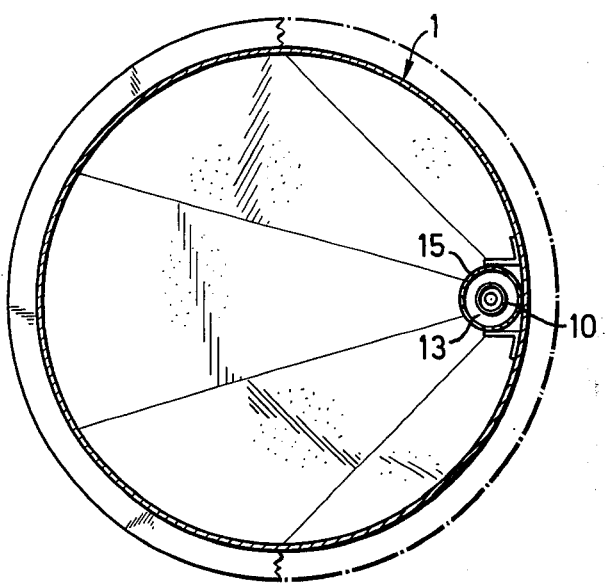

One embodiment of the invention will be described in more detail below with reference to the drawings, in which:

FIG. 1 is a schematic vertical section through the device provided by the invention; and FIG. 2 is a sectional view along the line II—II in FIG. 1.

The schematic drawings show a silo container 1 of relatively large capacity for fine material, with an upper cover 2 having a material inlet aperture 3, and with a base 5 inclined to a material discharge zone 4. In this embodiment the base 5 on the side facing the container interior is provided with air-permeable, porous plates 6 for loosening the fine material in the container. As may also be clearly seen from the drawings (see especially FIG. 1), the aeration surface 6a in the material discharge zone 4 is in general flat and horizontal. A feed air nozzle 7 projects from below through about the center of this aeration surface 6a into the material discharge zone 4.

Also provided is a pneumatic conveyor pipe 8 whose one section 9 is disposed generally vertically in the silo container 1 and whose material-receiving end 10 is approximately coaxial with the feed air nozzle 7 and terminates above that nozzle. The material discharge end 11 of the pneumatic conveyor pipe 8 lies outside the silo container 1 and leads to an onward conveyor member 12, which in this case comprises a pneumatic conveyor channel. The material discharge end 11 can in this case terminate directly in the pneumatic conveyor channel 12, so that distribution members or the like are not necessary. For many embodiments, especially those in which other onward conveyor members are used, it may however be desirable to take the material discharge end of the pneumatic conveyor channel into a distributor disposed above the onward conveyor members.

An important feature in this embodiment of the invention is that the material-receiving end 10 of the pneumatic conveyor pipe 8 is surrounded at a distance by the wall of a housing forming a relief chamber 13 which is disposed above the material discharge zone 4 and is connected by material entry slots 14, provided in the lower part of the chamber wall 15, to the remaining internal space of the silo container 1. The relief chamber 13 can have a polygonal cross-section which remains substantially the same over the entire height of the chamber. In the present embodiment (see especially FIG. 2) a substantially cylindrical housing 15, relatively simple to make, has been chosen; it lies generally coaxial with the material-receiving end 10 of the pneumatic conveyor pipe and hence surrounds this pipe at a uniform distance, selected according to requirements and in this case approximately the diameter of the conveyor pipe. Whether a polygonal cross-section or a cylindrical housing is chosen for the relief chamber, it will be desirable in either case to form the housing so that the height of the relief chamber is a multiple of its cross-sectional area or diameter, thus producing a relatively slender relief chamber 13; the ratio between the height and the diameter can for instance lie in the range 2.5–5:1.

The material entry slots 14 of the relief chamber 13, lying in this case directly above the aeration surface of the base 5 are provided with slider or throttle elements 14a, not shown in detail, so that the size of their aperture can be adjusted thereby to provide the possibility of regulating the feed of material to the pneumatic conveyor pipe and hence to enable the rate of conveyance of the pneumatic conveyor pipe to be adjusted. Control of the rate of extraction from the silo container and thus control of the conveyance rate of the pneumatic conveyor pipe can also be provided by a valve 7a for adjusting the amount of feeding air fed through the feed air nozzle 7. These two possible controls can be used separately or in conjunction.

As may also be clearly seen from the drawings, in the chosen embodiment the material discharge zone 4 is provided in the immediate vicinity of the peripheral wall of the silo container 1, in that the wall 15 of the relief chamber 13 lies directly against the inner side of the container wall and is affixed thereto. This arrangement also permits simplified holding against the inner container wall of the section of conveyor pipe 9 which passes generally vertically through the silo container 1.

In this connection it should however be noted that equally effective operation of the device provided in accordance with the invention for the extraction and direct pneumatic conveyance of the fine material in the container can also be achieved if for instance the material discharge zone 4 and thus the relief chamber 13 and the material-receiving end 10 of the pneumatic conveyor pipe 8 are disposed generally centrally in the silo container.

To ensure that the aeratable base below the relief chamber provides effective loosening, the generally flat horizontal aeration surface 6a is preferably made to correspond generally in shape and disposition to the cross-section of the relief chamber 13.

The disposition and form of the loosening base in a silo container in accordance with the invention, and the disposition and form of the material-receiving end of the pneumatic conveyor pipe provide an effective combination of pneumatic emptying means and pneumatic conveyance means, marked by great simplicity, low space requirements (as compared with the known constructions referred to initially) and reduced power consumption.

It will obviously be understood that the pneumatic conveyor pipe need not necessarily be disposed vertically in the silo conveyor, but depending on the particular usage the conveyor pipe may also be slightly inclined to lead out from the peripheral wall of the container.

What is claimed is:

1. Apparatus for pneumatically withdrawing fine material from a silo container having a peripheral wall and a base, said base being inclined toward a discharge zone, said apparatus comprising a housing within said container forming a relief chamber at said zone, said housing having apertures adjacent the base of said container to provide an entry for fine material into said chamber; an airfeed nozzle extending into said chamber from below; and a conveyor conduit extending into said chamber from above and having a receiving end in register with and spaced above said nozzle.

2. Apparatus according to claim 1 wherein said conduit and said chamber are substantially coaxial.

3. Apparatus according to claim 2 wherein said chamber has a substantially uniform cross-sectional area over its height.

4. Apparatus according to claim 1 wherein said housing has a height to cross-sectional area ratio between 2.5–5:1.

5. Apparatus according to claim 1 wherein said housing is immediately adjacent the wall of said container.

6. Apparatus according to claim 1 including means for adjusting the size of said apertures.

7. Apparatus according to claim 1 including means for adjusting the flow of air through said nozzle.

8. Apparatus according to claim 1 wherein said base is aeratable.

9. Apparatus according to claim 1 wherein said chamber has a bottom which is aeratable.

10. Apparatus according to claim 1 including conveyor means outward of said container, and wherein said conduit communicates with said conveyor means.

11. Apparatus according to claim 1 wherein said housing is cylindrical, coaxial with and spaced from said conveyor conduit, the spacing between said conveyor conduit and said housing corresponding substantially to the diameter of said conveyor conduit.

* * * * *